United States Patent
Gerstlberger et al.

(10) Patent No.: US 9,240,213 B2
(45) Date of Patent: Jan. 19, 2016

(54) METHOD AND ASSEMBLY FOR IMPROVED AUDIO SIGNAL PRESENTATION OF SOUNDS DURING A VIDEO RECORDING

(75) Inventors: Iris Gerstlberger, Munich (DE); Christian Hartmann, München (DE); Michael Meier, München (DE)

(73) Assignee: INSTITUT FUR RUNDFUNKTECHNIK GMBH, Munich (DE)

( * ) Notice: Subject to any disclaimer, the term of this patent is extended or adjusted under 35 U.S.C. 154(b) by 3 days.

(21) Appl. No.: 13/988,732

(22) PCT Filed: Nov. 24, 2011

(86) PCT No.: PCT/EP2011/070991
§ 371 (c)(1), (2), (4) Date: Aug. 27, 2013

(87) PCT Pub. No.: WO2012/069614
PCT Pub. Date: May 31, 2012

(65) Prior Publication Data
US 2014/0003796 A1   Jan. 2, 2014

(30) Foreign Application Priority Data
Nov. 25, 2010   (DE) .......................... 10 2010 052 527

(51) Int. Cl.
G11B 27/34 (2006.01)
G11B 27/031 (2006.01)
G11B 27/034 (2006.01)
G11B 27/10 (2006.01)
(Continued)

(52) U.S. Cl.
CPC ............ *G11B 27/031* (2013.01); *G06K 9/6293* (2013.01); *G11B 27/034* (2013.01); *G11B 27/105* (2013.01); *G11B 27/28* (2013.01); *G11B 27/322* (2013.01); *H04N 5/60* (2013.01)

(58) Field of Classification Search
None
See application file for complete search history.

(56) References Cited

U.S. PATENT DOCUMENTS 4,818,938 A   4/1989   Sattin et al.
5,159,140 A   10/1992   Kimpara et al.
(Continued)

FOREIGN PATENT DOCUMENTS

DE   10 2008 045 397 A1   3/2010
EP   0 142 179 A1   5/1985
(Continued)

OTHER PUBLICATIONS

M. Meier, *Sampling Bei Fussball-Fernsehproduktionen*, FKT Fernseh Und Kinotechnik, Fachverlag Schiele & Schon GMBH, Berlin, Germany, vol. 65, No. 5, May 1, 2011, pp. 244-247, XP-001562874.

(Continued)

*Primary Examiner* — William C Vaughn, Jr.
*Assistant Examiner* — Eileen Adams
(74) *Attorney, Agent, or Firm* — Workman Nydegger

(57) ABSTRACT

In order to achieve an improved audio presentation of sounds, in particular sports specific sounds, at reduced technical effort during any video recording, it is suggested to capture sensor-based and analyze image contents of video images. From the information obtained hereby, fitting sound events (audio samples) are selected according to predefined criteria from an audio database. The selected sound events are automatically added to the components of a video accompanying sound.

14 Claims, 3 Drawing Sheets

(51) Int. Cl.
  *G11B 27/28* (2006.01)
  *G11B 27/32* (2006.01)
  *H04N 5/60* (2006.01)
  *G06K 9/62* (2006.01)

(56) References Cited

U.S. PATENT DOCUMENTS

| | | | |
|---|---|---|---|
| 6,067,126 | A | 5/2000 | Alexander |
| 6,506,969 | B1 | 1/2003 | Baron |
| 2003/0194131 | A1 | 10/2003 | Zhao et al. |
| 2007/0104341 | A1 | 5/2007 | Kondo et al. |
| 2007/0279494 | A1 | 12/2007 | Aman et al. |
| 2008/0223196 | A1 | 9/2008 | Nakamura et al. |
| 2008/0249982 | A1* | 10/2008 | Lakowske ............ 707/3 |
| 2008/0256100 | A1 | 10/2008 | Van de Sluis et al. |
| 2009/0023123 | A1* | 1/2009 | Seo ............ 434/307 A |
| 2009/0074246 | A1* | 3/2009 | Distante et al. ............ 382/103 |
| 2009/0227353 | A1* | 9/2009 | Yoshizawa ............ 463/20 |
| 2011/0191674 | A1* | 8/2011 | Rawley et al. ............ 715/702 |
| 2013/0120123 | A1* | 5/2013 | Aman et al. ............ 340/323 R |

FOREIGN PATENT DOCUMENTS

| | | |
|---|---|---|
| GB | 2 362 986 A | 12/2001 |
| JP | 8-205278 | 8/1996 |
| JP | 2001-202082 | 7/2001 |
| JP | 2009-169109 | 7/2009 |
| WO | 2007/057850 A2 | 5/2007 |
| WO | 2009/007512 A1 | 1/2009 |

OTHER PUBLICATIONS

Search Report issued Aug. 13, 2011, in Application No. DE 10 2010 052 527.8.
International Search Report dated Feb. 22, 2012 issued in PCT/EP2011/070991, filed Nov. 24, 2011.
Written Opinion dated Feb. 22, 2012 issued in PCT/EP2011/070991, filed Nov. 24, 2011.

* cited by examiner

METHOD AND ASSEMBLY FOR IMPROVED AUDIO SIGNAL PRESENTATION OF SOUNDS DURING A VIDEO RECORDING

FIELD OF THE INVENTION

The invention relates to a method and an assembly for improved audio presentation of sounds, in particular sports specific sounds, during a video recording. Such a method and such an assembly are known from the DE 10 2008 045 397 A1.

DESCRIPTION OF THE PRIOR ART

By means of the introduction of high-definition television images in widescreen format accompanied by multi-channel television sound, in particular during the transmission of sports events, the television viewer is significantly more involved in the sports actions compared to conventional television technologies because considerably more details are perceivable. For the image and audio recording of live sports events, microphones frequently cannot be installed in sufficient number or in the desired proximity to important sound sources. These are primarily sounds that are characteristic for the specific sport and emphasize the directness of the image contents. Correspondingly, for example, in the television recording of soccer games, only few or no game specific sounds on the field are usually perceivable because the distances to the directional microphones surrounding the field are too large with respect to the noisy stadium atmosphere. For the television recording of ski races, a complete coverage of the kilometers-long ski trail with microphones would be too expensive. Consequently, for close recordings of game scenes or of races, the characteristic sounds are typically not captured by the audio recording.

From the DE 10 2008 045 397 A1, for capturing sports specific sounds during the video recording of ball sports events, it is known to provide a strongly directional microphone system with at least two directional microphones, each of them being aligned towards the current position of the ball by means of a guiding entity movable in all directions of space. The guiding of the microphones during the production occurs automatically, without manual intervention, in dependency of ball position data generated by means of a ball tracking method.

This known audio recording technology, however, cannot be applied for every video recording and requires a comparatively high technical effort.

SUMMARY OF THE INVENTION

The problem to be solved by the invention is to create a method and an assembly according to a design described in the beginning that allow(s) for an improved audio presentation of sounds at reduced technical effort during any video recordings.

According to the invention, this problem is solved for a method in that image contents are initially captured sensor-based and analyzed. By means of the information obtained hereby, fitting sound events are selected from a sound database according to predefined criteria. The selected sound events are automatically added to the additional components of the entire video audio mixing, referred to as video accompanying sound in the following.

An assembly for performing the method according to the invention consists of three core components: a sensor entity for detection of characteristic image contents of a video image, a central control unit that analyzes the image contents detected and, based thereon, selects audio samples fitting to the detected image contents from an audio database, which are mixed to the video accompanying sound in a mixer console.

BRIEF DESCRIPTION OF THE DRAWINGS

The invention will become fully clear from the following detailed description, given by way of a mere exemplifying and non limiting example, to be read with reference to the attached drawing figures, wherein.

DESCRIPTION OF THE PREFERRED EMBODIMENT

Figure 1:
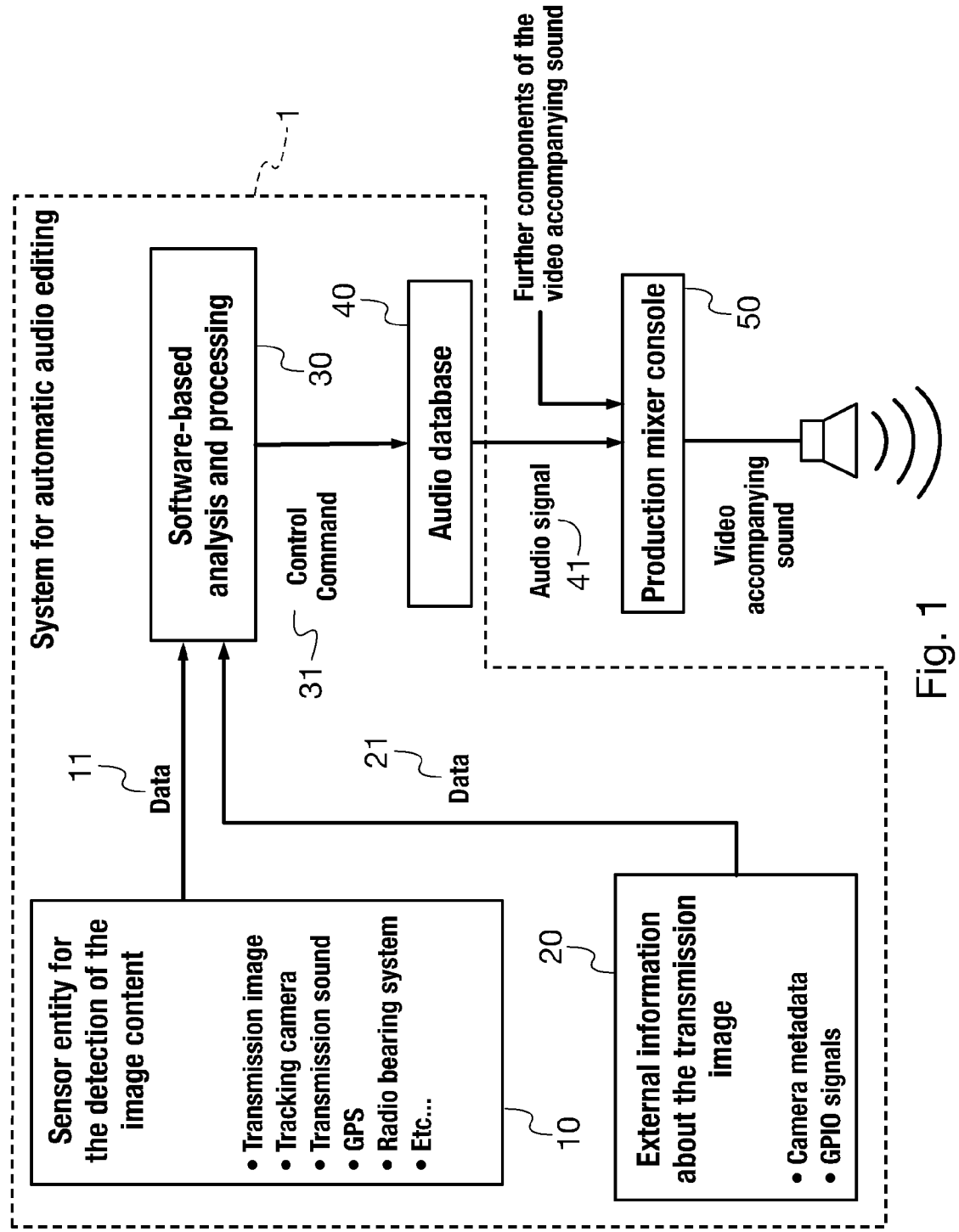
FIG. 1 shows a schematic block diagram of an assembly for performing the method according to the invention with the three core components: sensor entity, central control unit, and audio database.

The assembly 1 for performing the method according to the invention, which is schematically shown in FIG. 1, comprises a sensor entity 10 for the detection of the image content of video images. The detected image content is supplied by the sensor entity 10 in the form of data 11 to a software-based analysis and processing unit 30, which is shown in more detail in FIG. 2 and is to be explained later.

For example, the real-time images of a sports event (referred to as "transmission image" in FIG. 1 and the following description) supplied by a television camera may be used as video images for the detection of the image content. The sensor entity 10, for example, performs an analysis of the transmission image using algorithms from the field of "machine vision" (computer vision). These algorithms inter alia allow for the separation and tracking of moving objects against an image background as well as the determination of their positions in dependency of the image section. Taking a soccer game as an example, the location of the ball on the field as well as the position and the size of all soccer players shown in the image section may accordingly be determined. Further, it is possible to assign the players to different teams by means of their jerseys as well as to calculate the movement direction and velocity of the ball. The detection (and following analysis in the analysis and processing unit 30; FIG. 1) of the transmission image furthermore provides the advantage of being able to deduce the location and the focal length of the television camera currently chosen ("cut") by the image director during an game recording using multiple television cameras. Supplementary, in the sensory entity 10 and in the analysis and processing unit 30, the recording and automatic analysis of audio signals (referred to as "transmission sound" in FIG. 1 and the following description) is also possible which characterise specific actions within a scene of the transmission image. For example, the information obtained from the transmission sound is used to acoustically verify the image actions detected by means of video analysis. Further, sensors that determine the actions of the actors appearing in the transmission image in a physical way may be provided in the sensor entity 10, for closer definition and capturing of motion sequences. This includes, for example, the determination of the current position of actors by means of GPS or radio bearing system. As data 11, said additional information is also supplied to the software-based analysis and processing unit 30.

A technically less expensive possibility for detection of the image contents is using, for the video analysis, the signal of a dedicated and statically installed tracking-camera instead of the transmission image. The tracking camera may be calibrated to the corresponding scene in advance and thereby simplifies the automatic detection of objects and interactions in the video image. In this case, however, information about the actual transmission image must be supplied externally from a unit 20, for example, about (to be explained) camera metadata or GPIO signals of an image mixer console not shown in the drawings.

Figure 2:
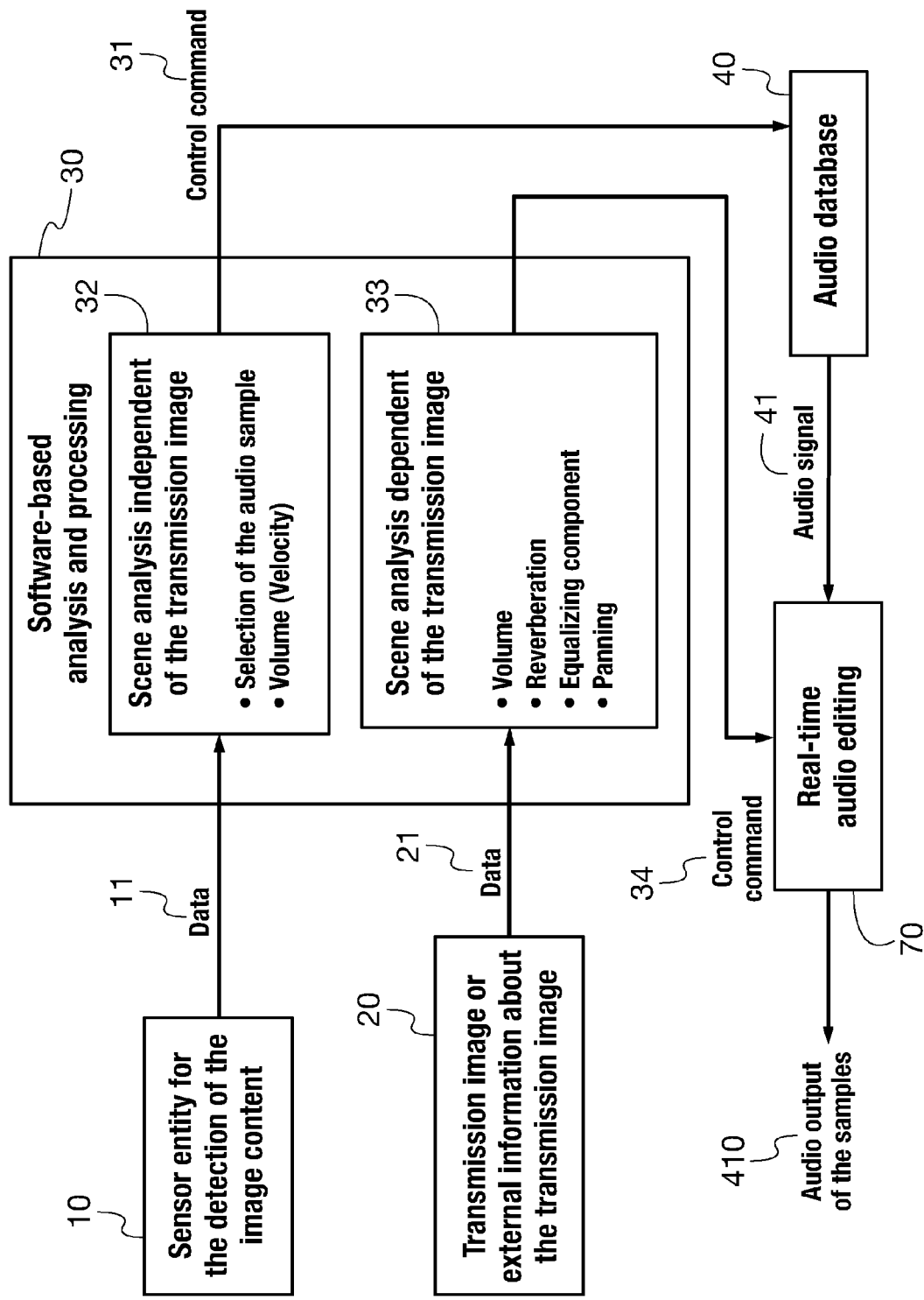
FIG. 2 shows details of the central control unit of the assembly according to FIG. 1.

The analysis and processing of the data 11 supplied by the sensor entity 10 is performed in the unit 30, which is illustrated in more detail in FIG. 2. The unit 30 deduced control commands 31 for an audio-database from the data 11 of the sensor entity 10, for example, as part of a PC- or DSP-based processing. In the unit 30, in a first analysis stage 32 (which analyses scenes independent of the transmission image), the parameters determined sensor-based for description of the video image are logically linked with each other according to predefined rules, and, by means of the resulting information, control commands 31 are generated for the selection of archived individual sounds, namely "audio samples", which are stored in the audio database 40. The predefined rules in turn are application-independent and, for each purpose, must be specifically specified and introduced into the software of the analysis and processing unit 30 in advance. The database 40 outputs the audio samples selected by control command 31 as audio signal 41 that is subsequently directly fed to the production mixer console 50 and, therein, may be mixed with other components of the video accompanying sound, such as with surrounding sounds ("original sound") as well as the "dialogue sound" of the game commentator where applicable. Hereby, it is to be taken care that no disturbing, temporally shifted doublings occur between audio samples and video accompanying sound. During the selection of the audio samples for the addition to the video accompanying sound, distinction is made between the following features to obtain an audio editing of a video scene sounding realistic (in the order of their relevance):
1. type of the sound
2. volume of the sound (velocity)
3. addition of reverberation (spatiality)
4. panning (assigning direction to the sound)

For the application of the method according to the invention to soccer games, such a specification of rules in the stage 32 means that, for example, based on information extracted from the video analysis with regard to the vector change of the ball movement, the origin of a new shot may be determined. The acceleration of the ball as well as the length of the movement vector on the field provide information about: whether it is a long distance shot or a pass having diverging sound characteristics; and how loud ("velocity" value) an according sound (audio signal 41) should be that is supplied to the production mixer console 50 (FIG. 1) from the audio database 40 according to the control command 31 generated by the unit 30. The volume of the sound supplied to the production mixer console 50 may further be varied in dependency of the position of the ball on the field, whereby the distance of the sound origin with respect to the viewer may be reproduced.

In the second analysis stage 33 (FIG. 2), which analyzes parameters depending on the transmission image, information about the image section of the transmission image is taken into account for the sound selection. This information is supplied as data 21 by the unit 20. In case the video analysis is performed in the transmission image directly, the camera position and the focal length may be determined by means of the size of the investigated objects. In case a separate tracking camera (FIG. 1) or other sensor systems are employed for the detection of the image content in the sensor entity 10, external information about the nature of the transmission image are taken into account. For this purpose, camera metadata extracted from the control unit of a television camera is inter alia applicable. Further, GPIO signals of a mixer console are applicable that signalize, which of the multiple television cameras is currently chosen ("cut") in the transmission image. On the basis of this data, the second analysis stage 33 generates a control command 34 for the variation of the volume of the audio signals 410 that are supplied to the production mixer console 50. This variation occurs by means of a stage 70, which is controlled by the control command 34, for real-time sound editing of the audio signal 41 of the audio database 40. By means of the additional variation of the volume of the audio signal 410 supplied to the mixer console 50, to some extent, the optical distance may be simulated, in which the viewer is situated with respect to the centre of the image action. Taking a soccer game as an example, by means of a different levelling of the ball sounds, the close-up recording of a tackling or wide-angle recording of the entire field may be recreated, wherein, in each case, the viewer assumes a different optical distance to the action.

Supplementary, by means of the second analysis stage 33, the stage 70, which is subordinated to the audio database 40, for the dynamic real-time sound editing may be controlled so that, by means of equalizing and addition of reverberation components in dependency of the object position in the video image, the influence of air dissipation and spatiality is recreated.

During the described real-time supply of the audio signal 41 or 410 to the mixer console 50, a specific temporal shift occurs between the audio signal 41 and the video image as a result of the detection and analysis of the image content. This temporal shift may, however, be limited to a range of less than four full images, whereby an unambiguous association of corresponding audio/video events is possible.

Figure 3:
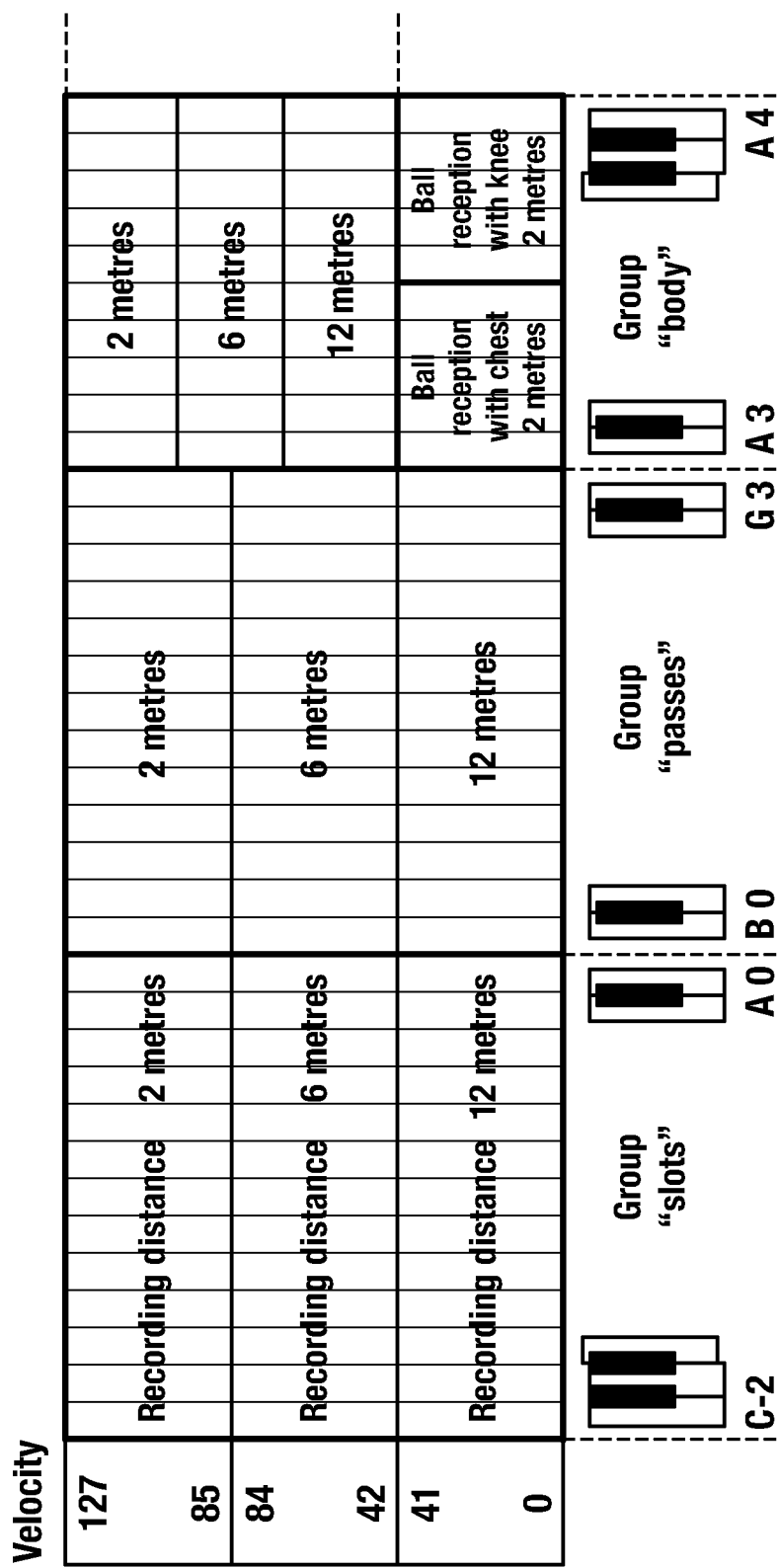
FIG. 3 shows an example for classification of audio samples into different categories (sample mapping) in the audio database.

An example for the organisation of the audio database 40 is illustrated for soccer by means of a "sample mapping" in FIG. 3. "Sample mapping" is understood as the classification of the audio samples stored in the database 40 into different categories. The audio database 40 may be put into practice both hardware-based and software-based and relies, for example, on a standard hardware/software sampler or a universal database format. The transmission of the control commands 31 and 34 to the database 40 may, for example, occur via the midi protocol. For sorting the audio samples in the audio database in dependency of the specific features of the audio samples, a "sample mapping" is provided, varying as the purpose of application arises.

Taking a soccer game to be joined with realistic sounds as an example, audio samples for different playing techniques in the form of ball receptions and ball deliveries by the body, foot and head of a player are distinguished. For playing techniques involving the body, ball receptions and deliveries with the chest, knee and head are further diversified. Foot receptions and deliveries are again divided into the groups "shots" and "passes".

For the embodiment according to FIG. 3, the audio samples are chosen with varying volume ("velocity") in dependency of the shot power determined from the video image in the analysis stage 33 (FIG. 2), and, by using different audio samples, the tonal differences of different playing intensities are taken into account. For example, the pop-like sound of a hard shot has a higher volume and another frequency composition than the sound of a less powerful shot. For this reason, the sound of a less powerful shot is not only mixed-in at lower volume but, additionally, another audio sample is employed. For this purpose, the audio samples are recorded with varying recording distance with respect to the sound source (2 meters, 6 meters, or 12 meters) when they are produced in order to reproduce a direct sound character for hard shots as well as an indirect sound character for less powerful shots.

During the playback, parameters, such as volume, reverberation component, panning, and equalizing, are changed by the stage 70 in dependency of the control command 34 predominantly in real-time. This offers the advantage that an own audio sample does not have to be stored for each and every possible parameterization, which drastically reduces both the storage requirement and the expenses during the production of such audio databases. In order to promote an authentic overall impression of the audio-edited scene, it is necessary to employ different audio-samples even for consecutive, similar image contents. For this purpose a random rotation of audio samples may be provided.

The invention claimed is:

1. A method for improved presentation of sounds during a video recording, wherein the video recording is a recording of a sport event, the method comprising:
    capturing image contents of video images included in the video recording of the sport event with sensors, wherein the video recording includes a video accompanying sound;
    analyzing the captured image contents to identify specific sport actions during the sport event;
    based on information obtained from the specific sport actions identified from the captured images, selecting audio events corresponding to said sport actions from an audio database according to predefined criteria; and
    automatically adding the selected audio events corresponding to said sports actions to components of the video accompanying sound of the video recording.

2. The method according to claim 1, wherein during sensor-based capturing of the image contents of currently transmitted video images (transmission images), an analysis of the transmission images is performed using algorithms from a field of "machine vision", wherein the algorithms are configured to separate and trace moving objects against an image background, and determine their positions in dependency of an image section.

3. The method according to claim 1, wherein during the sensor-based capturing of the image contents, instead of currently transmitted video images (transmission images), the signal of a dedicated and statically installed tracking camera is employed that is calibrated to a corresponding image scene, and external information about the transmission image is used for the analysis.

4. The method according to claim 1, wherein for more detailed definition and capturing of motion sequences, additional sensor-based parameters are captured that determine the actions of actors appearing in the video images in a physical way.

5. The method according to claim 1, wherein the information about the image section of the video image is taken into account when selecting the sound events.

6. The method according to claim 1, wherein parameters, captured sensor-based, for the description of the video image are logically linked to each other according to predefined rules, and control commands for the selection of archived individual sounds, referred to as "audio samples", are generated according to the resulting information.

7. The method according to claim 6, wherein the audio events are sorted in the audio database in dependency of the specific features of the audio events ("sample mapping").

8. The method according to claim 7, wherein for the "sample mapping" in a case of a soccer game to be joined with realistic sounds, audio events are distinguished in the groups "body", "shots" and "passes" for different playing techniques in the form of ball receptions and deliveries by the body or foot of a player.

9. The method according to claim 7, wherein for the "sample mapping" in a case of a soccer game to be joined with realistic sounds, audio events with varying volume are arranged depending on playing intensity detected, and different audio events take a tonal differences of different playing powers of shots, passes, and body receptions into account as well.

10. The method according to claim 1, wherein the method is carried out in real time.

11. The method according to claim 10, wherein a real time sound editing of the audio events played back from the audio database is performed in dependence of an analysis of the video image.

12. The method according to claim 11, wherein during the selection of the audio events from the audio database and real-time sound editing, distinction is made between the following features:
    type of the sound
    volume of the sound (velocity)
    reverberation addition (spatiality)
    panning (assigning direction to the sound).

13. The method according to claim 1, characterized in that audio signals of the video images are recorded and analyzed, which characterize specific actions of the images.

14. An assembly for improved presentation of sounds during a video recording of a sport event, the assembly comprising:
    a sensor for detection of characteristic image contents of a video recording of a sport event, wherein the video recording includes a video accompanying sound
    an analysis and processing unit for analyzing the detected image contents of the video recording,
    an audio database for archiving individual sound events that correspond to specific actions, and
    a mixer console,
    wherein the sensor is adapted to identify specific sport actions during the sport event,
    the analysis and processing unit is adapted to select an audio event from the audio events archived in the audio database that corresponds to the specific sport action identified by the sensor in the video recording, and
    the mixer console is adapted to mix the audio event selected by the analysis and processing unit corresponding to the specific sport action to the video accompanying sound of the video recording.

* * * * *